No. 885,878. PATENTED APR. 28, 1908.
J. F. SKIRROW.
STEERING ROD CONNECTION.
APPLICATION FILED NOV. 4, 1907.
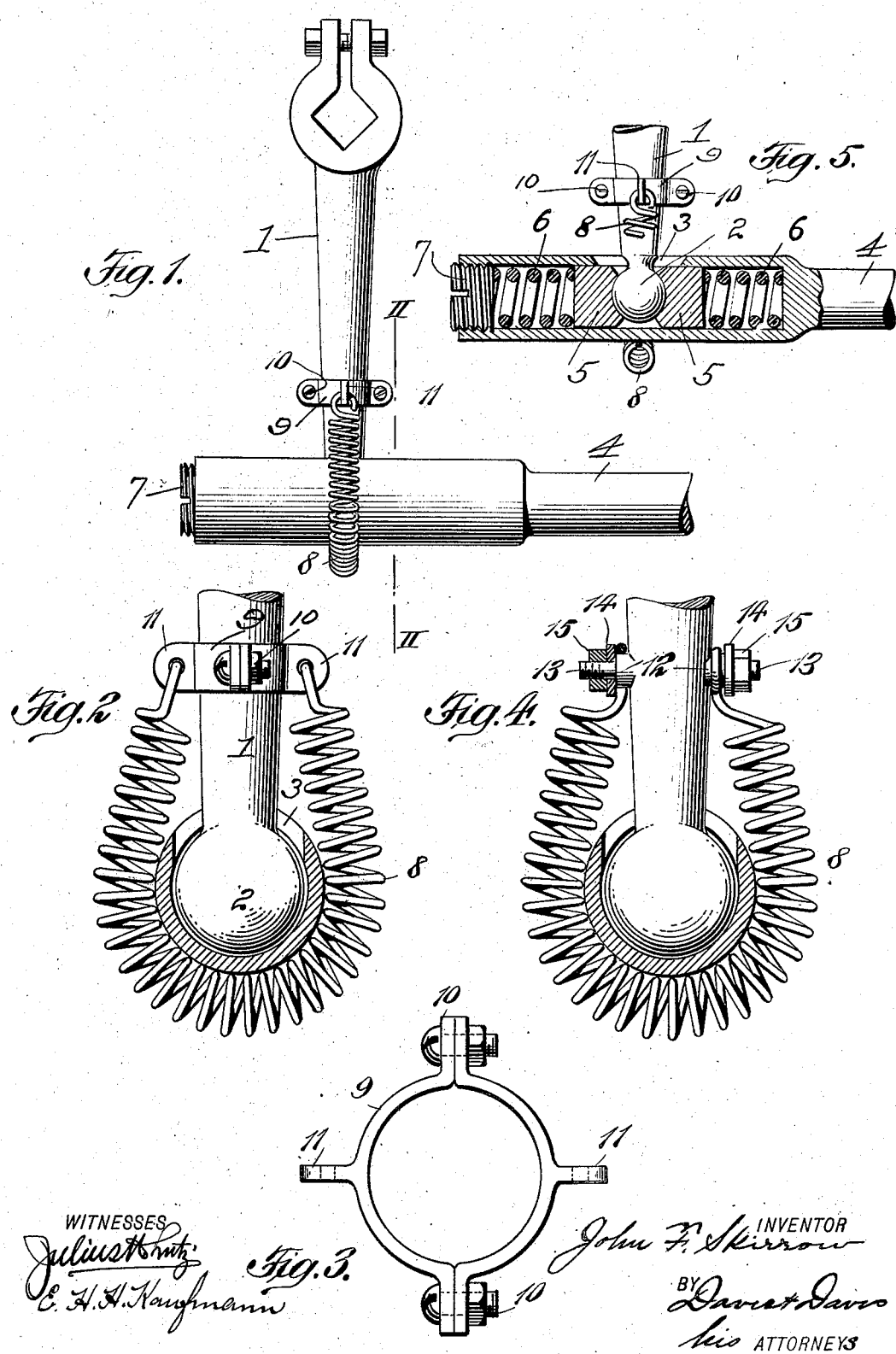
WITNESSES
INVENTOR
John F. Skirrow
BY
his ATTORNEYS

UNITED STATES PATENT OFFICE.

JOHN F. SKIRROW, OF EAST ORANGE, NEW JERSEY.

STEERING-ROD CONNECTION.

No. 885,878.   Specification of Letters Patent.   Patented April 28, 1908.

Application filed November 4, 1907. Serial No. 400,476.

*To all whom it may concern:*

Be it known that I, JOHN F. SKIRROW, a citizen of the United States, residing at East Orange, in the county of Essex, State of New Jersey, have invented certain new and useful Improvements in Steering-Rod Connections, of which the following is a specification, reference being had therein to the accompanying drawing, in which—

Figure 1 is a side elevation showing a steering crank connected to one end of a steering rod with my invention applied thereto; Fig. 2 a transverse sectional view of the steering rod taken on the line II—II of Fig. 1; Fig. 3 a detail plan view of the clamp which is adapted to be secured to the steering crank; and Fig. 4 a view similar to Fig. 2, showing a slightly different form of steering crank; Fig. 5 a longitudinal vertical sectional view of the device shown in Fig. 1.

It is common knowledge that a great many automobile accidents are the results of failures of the steering gears. One defect of the steering mechanism as now used by some automobile manufacturers is that the steering crank is not properly connected to the steering rod which connects the said crank to the steering knuckles.

It is the object of this invention to provide means to connect the steering rod to the steering crank or to the steering knuckle in such manner that there can be no accidental separation or disconnection of said parts, while at the same time allowing the requisite flexibility between said parts.

Another object of the invention is to provide such a safety device which will serve as a means for holding the connected parts in close engagement to prevent unnecessary vibration and the consequent noise and wear and tear.

Referring to the various parts by numerals, 1 designates the steering crank which may be connected to the steering wheel and operated through said wheel in any suitable manner. This steering crank is provided at its free end with a bearing ball 2 which is adapted to enter a slot 3 formed in the tubular end of the steering rod 4. Within the steering rod on each side of the ball 2 are arranged the bearing blocks 5, one of which engages the ball on each side. Within the tubular end of the steering rod and bearing against the bearing blocks are springs 6 which serve to hold the bearing blocks in close engagement with the ball 2. A screw plug 7 is provided in the end of the steering rod by which the tension of the springs and their pressure on the blocks may be regulated. In this form of the steering rod connection it is evident that should the springs fail to work and the blocks be permitted to separate there is nothing to prevent the steering rod dropping down from the ball of the steering crank and it is the object of this invention to provide adequate means to hold the steering crank and the steering rod in close engagement while at the same time permitting the crank to have a certain amount of movement with respect to the steering rod without binding. This safety device consists of a flexible coil spring 8 connected at its ends to the steering crank above the steering rod and extending around under the rod, as shown clearly in Fig. 2. As a convenient means for connecting the ends of the spring to the steering crank I provide a clamp 9 which is adapted to be connected to the steering crank by means of the screws 10. On this clamp are formed diametrically opposite lugs 11 to which are connected the ends of the retaining spring. The clamp 9 is so located on the steering crank that the spring 8 will be held under a tension so as to constantly draw the steering rod and the steering crank toward each other. It will thus be seen that should the bearing blocks separate sufficiently to permit the ball 2 to slip from between them the coil spring 8 will hold the steering crank and the rod together and prevent any material separation thereof. It is also to be seen that the flexible coil spring will permit the steering crank to be moved with respect to the steering rod.

It is obvious that when power is applied to the steering crank the springs, engaging the ends of the bearing blocks, will yield at first until the pressure is sufficient to cause the steering rod to move with the steering crank and the flexible retainer or safety device must be of such construction that it will permit the steering crank to move longitudinally with respect to the steering rod. It is also to be noted that the coil spring retainer will hold the steering rod in close contact with the steering crank and thereby prevent undue vibration and rattling between those parts.

In Fig. 4 the clamp 9 is dispensed with and the ends of the coil spring are secured to integral lugs formed on the sides of the steering crank. As shown in this view the steering crank is formed with lugs 12 having the threaded extensions 13 and the ends of the coil spring are secured in place by means of the washers 14 and nuts 15.

It will, of course, be understood that many forms of fastening devices may be used to connect the ends of the flexible retainer to the steering crank, those shown being merely by way of illustration and with no intention of limiting myself to any precise forms or devices.

I desire it understood that this flexible retaining device may be employed wherever a ball and socket construction is used to connect a crank end with a rod or bar and I do not desire to be limited to the precise use of the device shown in the drawings.

Having thus described my invention, what I claim as new and desire to secure by Letters Patent, is:—

1. A steering rod connection comprising two members one of which is formed with a ball and the other with a socket to receive said ball, yieldable means within the socket to retain the ball member therein, a yieldable retainer connected to the ball-carrying member and extending around the socket member whereby the two members will be held yieldingly together and said members may have a movement with respect to each other.

2. A steering rod connection comprising two members one of said members being formed with a ball and the other with a socket to receive said ball, means for yieldably holding said ball in said socket and permitting it to have a longitudinal movement therein, and a spring retainer connected to the ball-carrying member and extending around the socket member and serving to draw said two members toward each other while at the same time permitting the ball-carrying member to have a longitudinal movement in the socket member.

3. A steering rod connection comprising two members one of said members being formed with a ball or enlargement and one with a socket to receive said ball, yieldable means within the socket to permit longitudinal movement of the ball therein, a coil spring connected at its ends on opposite sides of the ball-carrying member and extending around the socket member and serving to draw said members toward each other, whereby said spring will serve to hold the socket member to the ball-carrying member while at the same time permitting an independent movement of the ball-carrying member in the socket member.

4. A steering rod connection comprising two members one of said members being formed with a ball or enlargement and one with a socket to receive said ball, yieldable means within the socket to permit longitudinal movement of the ball therein, a coil spring connected at its ends on opposite sides of the ball-carrying member and extending around the socket member and serving to draw said members toward each other whereby said spring will serve to hold the socket member to the ball-carrying member while at the same time permitting an independent movement of the ball-carrying member in the socket member, and means for detachably connecting the ends of said spring to the ball-carrying member.

5. A steering rod connection comprising two members, one of which is formed with a ball and the other with a socket to receive said ball, a yieldable retainer connected to the ball-carrying member and extending around the socket member, whereby the two members will be yieldingly held together and said members will have a movement with respect to each other.

6. A ball and socket joint comprising a part having a ball thereon, a part having a socket to receive said ball, and a spring retaining device connected to the ball-carrying part and forming a loop around the socket part and yieldingly holding the two parts in working relation while permitting the socket part to move through said yielding device.

In testimony whereof I hereunto affix my signature in the presence of two witnesses this 23rd day of October, 1907.

JOHN F. SKIRROW.

Witnesses:
F. A. NORMAN,
THEODORE L. CUYLER, Jr.